Patented Jan. 19, 1954

2,666,729

UNITED STATES PATENT OFFICE 2,666,729

PROCESS FOR PURIFYING STREPTOKINASE

Werner Baumgarten, Drexel Hill, Pa., assignor to Merck & Co., Inc., a corporation of New Jersey No Drawing. Application June 14, 1951,
Serial No. 231,661

4 Claims. (Cl. 167—73)

This invention relates to an improved method of concentrating and purifying streptokinase from culture broths of streptokinase-producing micro-organisms and other impure aqueous solutions. More particularly the invention relates to a method of purification of streptokinase involving adsorption of streptokinase from an acid solution on diatomaceous earth material, elution of the streptokinase therefrom with a buffered alkaline solution, and recovery of the purified streptokinase.

Cultures or culture filtrates of certain strains of beta hemolytic streptococci bring about rapid lysis of the fibrin clot formed on adding calcium or thrombin to human plasma. The active agent in such cultures has been identified as streptokinase which has been found to be associated most consistently with hemolytic streptococci of the Lancefield groups A, "human" C, and G. The action of streptokinase is catalytic in nature and serves as an activator for an enzyme precursor present in human plasma which acts not only on fibrin and fibrinogen but also on gelatin, casein and other proteins.

Streptokinase is extremely important and valuable in the field of medicine because of its use in the enzymatic debridement of fibrinopurulent empyema and other exudates. This enzymatic action tends to liquify the dead substance and provides for a non-surgical cleansing of the wound.

Heretofore, the most common method of isolating streptokinase from culture filtrates has been one in which the active substance is precipitated therefrom with large quantities of ethanol, the latter being employed in amounts up to 50%. Since ethanol is expensive, such a procedure is costly especially if it is employed on a commercial scale. In addition, since large volumes of liquid are employed, it is cumbersome, especially where one seeks to recover the ethanol employed.

The object of the present invention is to provide a method of isolation of streptokinase from fermentation broth or other impure aqueous solutions which is simple, economical and does not require the use of large volumes of ethanol or other expensive precipitants.

Culture broth may be obtained by the propagation of streptokinase-producing micro-organisms, for example, certain strains of beta hemolytic streptococci, in a suitable culture medium. A good strain of micro-organism for this purpose is a "human" group C strain of streptococcus hemolyticus, also known as strain H46A. When maximum streptokinase production has been achieved, the streptococcal cells and other solid impurities are removed from the culture broth by suitable means such as centrifugation, decantation or filtration. Centrifugation with a Sharples centrifuge is the preferred means of separation. The active material will now be found to be present in the centrifugate. The sediment is therefore discarded.

The pH of the centrifugate is now adjusted to within the pH range of about 3.5 to about 5.0 and preferably to about 4.2. This may be done by the addition of a suitable acid such as hydrochloric or glacial acetic acid.

In accordance with the most advantageous application of the present invention the streptokinase is separated from the acidified, clarified, culture broth by adsorption with a diatomaceous earth. The broth and the diatomaceous earth are admixed either by stirring the earth in the broth or by passing the broth through the earth. Diatomaceous earths manufactured by the Johns-Manville Company and sold under the trademark, Super-Cel were found to give good results. This applied to both Standard Super-Cel and Hyflo Super-Cel. It is desirable to add enough of the diatomaceous earth material to adsorb as much of the streptokinase as possible, without adding so much as to make the subsequent recovery steps too cumbersome or difficult. If Hyflo Super-Cel is employed, about 0.75% (750 mg. of Super-Cel per 100 cc. of centrifugate) has been found to be an optimum amount to use. If Standard Super-Cel is used, about 0.3% (300 mg. of Super-Cel per 100 cc. of centrifugate) gives good results. It should be understood, of course, that while these percentages are suggested as giving good results, the amount of diatomaceous earth employed may vary within wide limits. It is desirable, though not essential, to stir the mixture to aid the adsorption process. Stirring for about 15 minutes should be ample.

The adsorbent is then separated from the fermentation broth by suitable means such as centrifugation, filtration or decantation and the like and the broth discarded. The streptokinase, together with certain other nitrogenous impurities has been adsorbed by the diatomaceous earth. The diatomaceous earth is now washed to remove inert substances, such as color and nitrogenous impurities. It has been found that a low pH buffer solution as, for example, 0.1 to 0.5 molar acetate or citrate buffer at a pH of about 3.5 to 5.0 is a suitable washing material. The adsorbent may be washed several times with portions of the buffer solution to remove color and impurities without any substantial removal of active substance.

The streptokinase, which has been adsorbed upon the diatomaceous earth, is now eluted therefrom. This is done by raising the pH to about 7.0 to 8.0 with a suitable elution agent as for example, a borate buffer of a pH of about 7.0 to 8.0. The elution may be carried out by admixing the adsorbent and the elution agent, preferably with stirring. Sufficient elution agent should be employed to raise the pH of the entire mixture to about 7.8 in order to obtain optimum elution. This may be done by testing the pH of the mixture with each addition of a quantity of elution agent until the pH is brought within the desired range. Stirring, while not essential, will facilitate elution of the active material. The eluate is then separated from the adsorbent by suitable means such as centrifugation, filtration, decantation and the like. Basket centrifugation has been found to be a satisfactory means of separation. Several fractions may be eluted and it can be determined by assay whether subsequent elutions contain active substance. If more than one elution is carried out, the eluate in each case may be added to the fraction first eluted.

The streptokinase may now be used in this crudely concentrated form or it may be purified even further. If it is to be employed in crude form without further purification it should be sterilized by suitable means and subjected to freeze-drying since it is rather unstable in liquid form.

If a more highly purified form is desired, the pH of the eluate is adjusted to about pH 6 by the addition of a suitable acid as, for example, hydrochloric or glacial acetic acid and then a protamine salt as, for example, 1% protamine sulfate solution is added. Addition of a protamine salt results in precipitation of additional impurities, particularly of nucleic acids and nucleoproteins. The amount of protamine to be added can be determined by formation of a precipitate. Protamine may be added until no further precipitation occurs. The precipitated impurities are now separated from the liquid and discarded. Separation may be by any suitable means such as centrifugation, filtration, decantation and the like. The liquid may now be diluted to the desired unit strength and then sterilized. Sterilization may be carried out by filtration through a filter candle or a sterile pad. In either case the filter should first be pretreated by passing a suitable gelatin buffer through it. If a filter is employed which is not first pretreated in such manner, considerable loss in streptokinase activity may occur. The active streptokinase is now present in the filtrate in a purified form. However, since it is rather unstable in solution, it should be dried, preferably by the freeze-dry technique, to render it stable and ready for use.

The process herein outlined for the isolation and recovery of streptokinase may be more clearly illustrated by the following specific examples, although it should be clearly understood that these are offered for purposes of illustration of the invention, and the specific embodiment of the invention is not to be limited thereto:

*Example 1.*—30 liters of fermentation broth at a pH of 5.7 was centrifuged in a Sharples centrifuge. The pH of the centrifugate was adjusted to pH 4.2 with 200 ml. of glacial acetic acid and stirred with 225 grams (0.75%) of Hyflo Super-Cel for 15 minutes. The mixture was then filtered on a 12 inch Buchner funnel and the Super-Cel washed with 10 liters of pH 4.6 acetate buffer (5.7 ml. of glacial acetic acid +13.6 grams of sodium acetate per liter), followed by 2 liters of distilled water. The Super-Cel was then removed from the funnel and suspended in a mixture of 400 ml. of borate buffer (pH 7.8) and 600 ml. of water. (The borate buffer has the following composition: 4 grams sodium tetraborate [$Na_2B_4O_7.10H_2O$], +11.25 grams boric acid [$H_3BO_3$], +2.25 grams sodium chloride [$NaCl$], distilled water q. s. to one liter. The mixture was filtered and the adsorbent resuspended in 200 ml. borate buffer +800 ml. of $H_2O$ and the process was repeated once more. The filtrates were combined and then shell-frozen and lyophilized in the usual manner.

*Example 2.*—78 liters of fermentation medium, pH 5.5 were centrifuged in a Sharples centrifuge. The centrifugate was adjusted to pH 4.25 with 350 ml. of glacial acetic acid and stirred with 234 grams (0.3%) of Standard Super-Cel for 15 minutes. The Super-Cel was then filtered on a 12 inch Buchner funnel, and the residue washed with 8 liters of acetate buffer, pH 4.6, followed by 2 liters of distilled water. The filter cake was suspended in 3 liters of borate buffer (800 ml. of borate buffer and 2200 ml. of water), stirred and the supernatant removed in a basket centrifuge. The filter cake was resuspended in 2½ liters of borate buffer (500 ml. borate and 2000 ml. of water) and again centrifuged in a basket centrifugate. The eluate was then shell-frozen and lyophilized. The lyophilized material was then dissolved in water to give the desired number of units per ml. A Hormann filter with an S-3 pad was sterilized and 100 ml. of a gelatin buffer was passed through it (the composition of the gelatin buffer was as follows: 5 grams of calf skin gelatin, 9 grams of sodium chloride, 13.6 grams of potassium phosphate, mono-basic [$KH_2PO_4$], distilled water q. s. to one liter.) The solution containing the active material was then filtered through this pad and collected aseptically in a second container. This sterile streptokinase solution was then filled aseptically into vials and lyophilized.

What is claimed is:

1. The process of concentrating and purifying streptokinase from a culture broth containing streptokinase which comprises adjusting the pH of the broth to within the pH range of 3.5 to 5.0, admixing therewith a diatomaceous earth, separating the diatomaceous earth from the broth, admixing the diatomaceous earth with an alkaline solution at pH 7.0 to 8.0 and separating the solution from the diatomaceous earth.

2. A process as claimed in claim 1 in which the alkaline solution employed to elute the streptokinase from the adsorbent is a borate buffer.

3. The process of concentrating and purifying streptokinase from a culture broth containing streptokinase which comprises adjusting the pH of the broth to within the pH range of 3.5 to 5.0, admixing therewith a diatomaceous earth, separating the diatomaceous earth from the broth, washing the diatomaceous earth with an acid buffer solution at pH 3.5 to 5.0, admixing the diatomaceous earth with an alkaline solution at pH 7.0 to 8.0 and separating the solution from the diatomaceous earth.

4. A process as claimed in claim 3 in which the acid buffer solution employed in the washing step is an acetate buffer.

WERNER BAUMGARTEN.

References Cited in the file of this patent

UNITED STATES PATENTS

| Number | Name | Date |
|---|---|---|
| 2,442,452 | Alderton | June 1, 1948 |
| 2,524,658 | Frederiksen | Oct. 3, 1950 |

FOREIGN PATENTS

| Number | Country | Date |
|---|---|---|
| 356,638 | Great Britain | of 1931 |

OTHER REFERENCES

Christensen, J. Clin. Investig., volume 28, pages 163 to 164 (1949).

Fruton, in Ann. Review of Biochemistry, 1947, pages 49 to 50.